(12) United States Patent
Himmelmann

(10) Patent No.: US 7,728,475 B2
(45) Date of Patent: Jun. 1, 2010

(54) THERMALLY OPERATED ROTATABLE COMPONENT RESTRAINT SYSTEM

(75) Inventor: Richard A. Himmelmann, Beloit, WI (US)

(73) Assignee: Hamilton Sundstrand Corporation, Rockford, IL (US)

( * ) Notice: Subject to any disclaimer, the term of this patent is extended or adjusted under 35 U.S.C. 154(b) by 536 days.

(21) Appl. No.: 11/708,621

(22) Filed: Feb. 20, 2007

(65) Prior Publication Data

US 2008/0197634 A1 Aug. 21, 2008

(51) Int. Cl.
*H02K 5/16* (2006.01)
*F16C 27/02* (2006.01)

(52) U.S. Cl. .................... 310/90; 310/306; 310/307; 290/52; 384/103; 384/261

(58) Field of Classification Search .................... 310/90; 290/52; 384/103, 117, 309, 312, 247, 261, 384/627
See application file for complete search history.

(56) References Cited

U.S. PATENT DOCUMENTS

| 2,793,811 | A | | 5/1957 | Coselman |
| 2,881,890 | A | | 4/1959 | Welch |
| 3,899,224 | A | * | 8/1975 | Schuller et al. ............. 384/103 |
| 3,976,543 | A | | 8/1976 | Sowa |
| 4,556,132 | A | | 12/1985 | Lengsfeld et al. |
| 4,654,192 | A | | 3/1987 | Hutter et al. |
| 5,497,615 | A | * | 3/1996 | Noe et al. ................. 60/39.511 |
| 5,498,083 | A | * | 3/1996 | Brown ......................... 384/106 |
| 5,938,344 | A | * | 8/1999 | Sabin .......................... 384/278 |
| 6,276,124 | B1 | | 8/2001 | Soh et al. |
| 2008/0197634 | A1 | * | 8/2008 | Himmelmann ............... 290/52 |

FOREIGN PATENT DOCUMENTS

| JP | 09009558 | * | 1/1997 |
| JP | 2002-295467 | * | 10/2002 |

OTHER PUBLICATIONS

Machine Translation of 09-009558, Jan. 1997, Makoto Mikami, "Foil Type Gas Bearing".*
Machine Translation of 2002-295467, Oct. 2002, Saito et al., "Fluid lubrication type foil bearing for gas turbine electrical power generation device, has bimetallic leaf foil supporting revolving shaft such that axial centers of bearing and revolving shaft are in alignment".*

* cited by examiner

*Primary Examiner*—Karl I Tamai
(74) *Attorney, Agent, or Firm*—Kinney & Lange, P.A.

(57) ABSTRACT

A turboalternator system includes a turboalternator having a rotatable member operatively engaged to a bearing set, a radial support element, and a contact structure engaged with the radial support element. The rotatable member defines a first end, a second end and an axis of rotation. The turboalternator system is configured to be thermally adjustable such that in a first thermal condition the contact structure is at a first radial position with respect to the axis of rotation and contacts the rotatable member to provide support, and in a second thermal condition the contact structure is at a second radial position with respect to the axis of rotation that is spaced further from the axis of rotation than the first radial position.

21 Claims, 5 Drawing Sheets

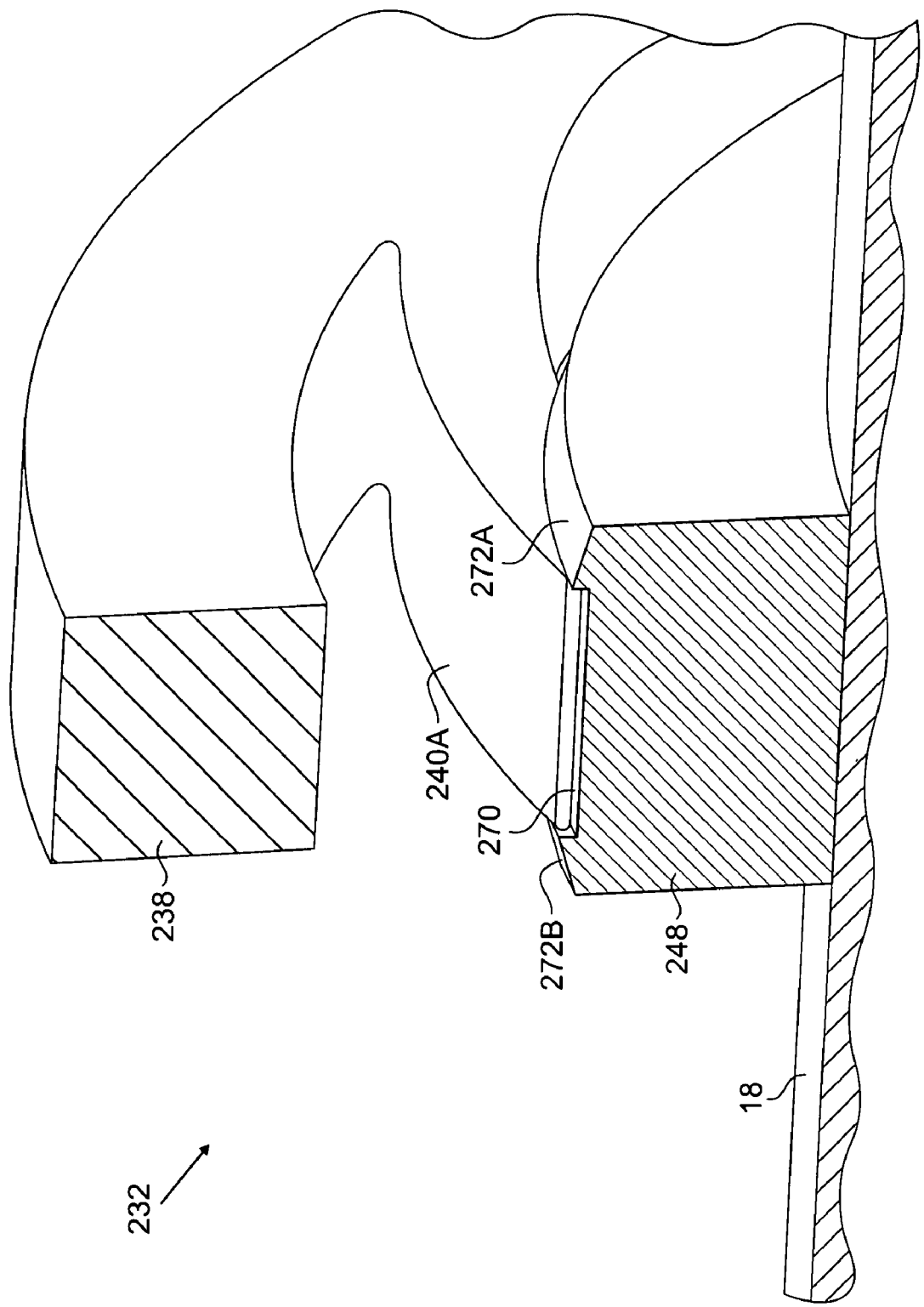

THERMALLY OPERATED ROTATABLE COMPONENT RESTRAINT SYSTEM

BACKGROUND OF THE INVENTION

The present invention relates to systems for restraining rotatable components, and more particularly to thermally operated systems for restraining rotatable components of turboalternators.

Foil bearings are a known type of bearing structure that utilize a thin metal journal lining to support a rotatable shaft and create a hydrodynamic film or air bearing with a working fluid (e.g., xenon gas). For example, certain closed Brayton cycle turboalternators can utilize a turboalternator shaft supported by foil bearings. At operational speeds, the rotating shaft is supported by the fluid pressure of the working fluid and generally does not contact the metal structures of the foil bearings. This means that no wear occurs due to direct physical contact with the rotating shaft during operation, although some contact with metal components of the bearings occurs during startup, shutdown and non-operational periods.

However, foil bearings are susceptible to damage, which can reduce or destroy bearing functionality. For instance, with foil bearings used in turboalternators for spacecraft, the turboalternator may not be used during a launch phase of a flight cycle and may only be activated for operation during a later orbital phase of the flight cycle. Because the launch phase will generally subject turboalternator components to stresses, vibration, displacement and other potential sources of damage, it is desired to restrain rotatable components of the turboalternator to prevent damage to the foil bearings during non-operational phases where a hydrodynamic film is not generated and rotatable components can contact the metal structures of the bearings. Active restraint systems, using solenoid actuators or the like, can be used to restrain the rotating components of the turboalternator during the launch phase, but those active systems contain moving parts that present undesirable reliability risks, especially under conditions of extreme ambient temperature variation that occur in aerospace applications.

BRIEF SUMMARY OF THE INVENTION

A turboalternator system includes a turboalternator having a rotatable member operatively engaged to a bearing set, a radial support element, and a contact structure engaged with the radial support element. The rotatable member defines a first end, a second end and an axis of rotation. The turboalternator system is configured to be thermally adjustable such that in a first thermal condition the contact structure is at a first radial position with respect to the axis of rotation and contacts the rotatable member to provide support, and in a second thermal condition the contact structure is at a second radial position with respect to the axis of rotation that is spaced further from the axis of rotation than the first radial position.

BRIEF DESCRIPTION OF THE DRAWINGS

FIG. 5 is a cross-sectional perspective view of the restraint system of FIG. 4.

DETAILED DESCRIPTION

Figure 1:
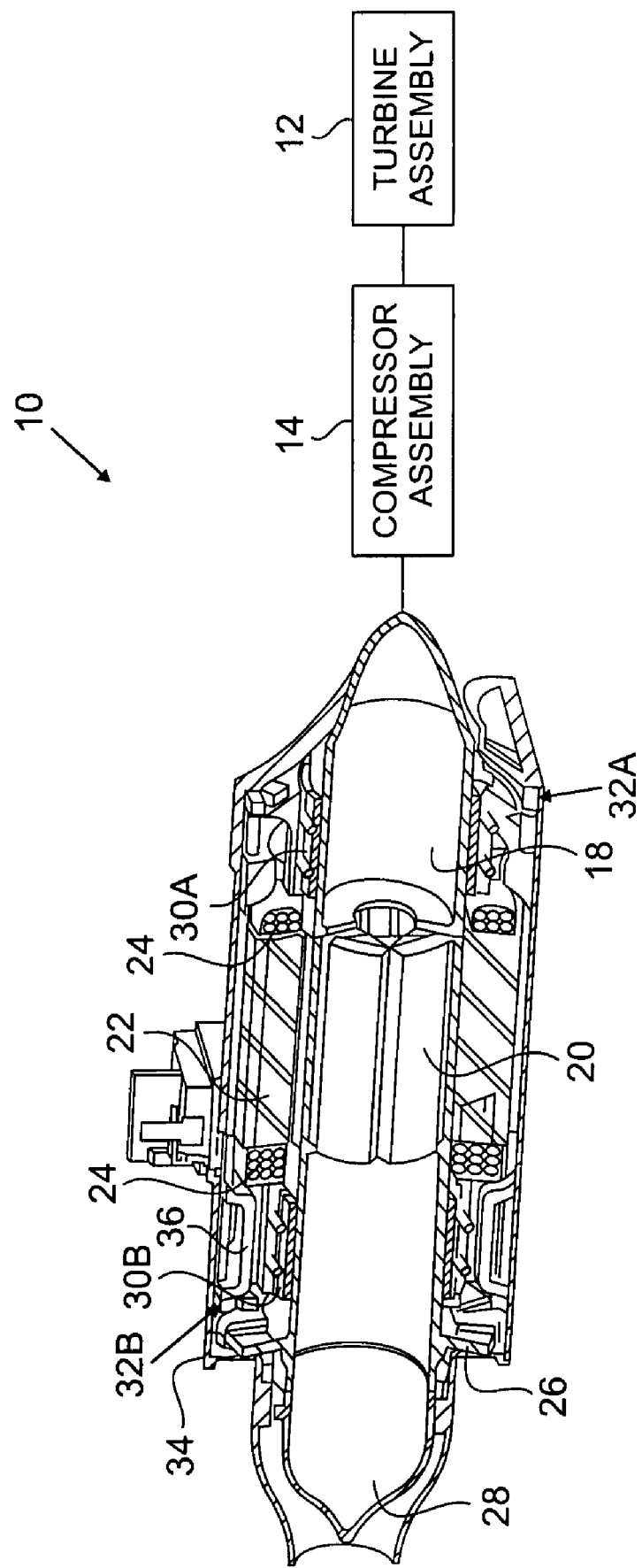
FIG. 1 is a cross-sectional perspective view of a close Brayton cycle turboalternator having a restraint system according to the present invention.

FIG. 1 is a cross-sectional perspective view of a closed Brayton cycle turboalternator 10 that includes a turbine assembly 12, a compressor assembly 14, a rotatable alternator shaft 18, permanent magnets 20, a stator assembly 22, alternator windings 24, a gas thrust bearing assembly 26, a cooling fan diffuser 28, first and second foil bearing assemblies 30A and 30B, passive restraint assemblies 32A and 32B (collectively, restraint system 32), and an alternator housing 34. The turbine assembly 12 and the compressor assembly 14, both shown schematically in FIG. 1 for simplicity, are operably connected to the shaft 18. In general, the turboalternator 10 operates by converting thermal energy from an external source into rotational energy that turns the shaft 18. The shaft 18 then rotates the permanent magnets 20 with respect to the stator assembly 22 and the alternator windings 24 in order to generate an electrical current. In this respect, the turboalternator 10 can operate in a conventional manner as will be understood by those of ordinary skill in the art, and therefore it is not necessary to discuss further details of the configuration and operation of the turboalternator 10. However, it should be noted that the turboalternator 10 of FIG. 1 is shown by way of example and not limitation, and the present invention is equally applicable to turboalternators having other known configurations.

The shaft 18 is operatively supported by the first and second foil bearing assemblies 30A and 30B, which are, in turn, supported by bearing carriers 36 and the housing 34. The foil bearing assemblies 30A and 30B can be of a conventional type where, during operation, when the shaft 18 is rotating, the shaft 18 is supported by the fluid pressure of a working fluid (e.g., xenon gas) present between the shaft 18 and metallic structures of the foil bearing assemblies 30A and 30B. During operation, the rotating shaft 18 generally does not contact the metal components of foil bearing assemblies 30A and 30B. This means that generally no wear occurs due to direct physical contact between the rotating shaft 18 and the metallic structures of the foil bearing assemblies 30A and 30B during operation, although some incidental contact may occur.

The turboalternator 10 can be installed in a space shuttle or other aerospace vehicle (not shown) that typically will undertake a flight cycle that includes a launch phase, where the turboalternator 10 is not operational, and an orbital phase, where the turboalternator 10 is activated and operated. The restraint system 32 helps to secure the rotatable shaft 18 of the turboalternator 10 when not operational, such as during the launch phase, in order to help reduce the possibility of damage to the foil bearing assemblies 30A and 30B due to undesired movement of the shaft 18.

Figure 2:
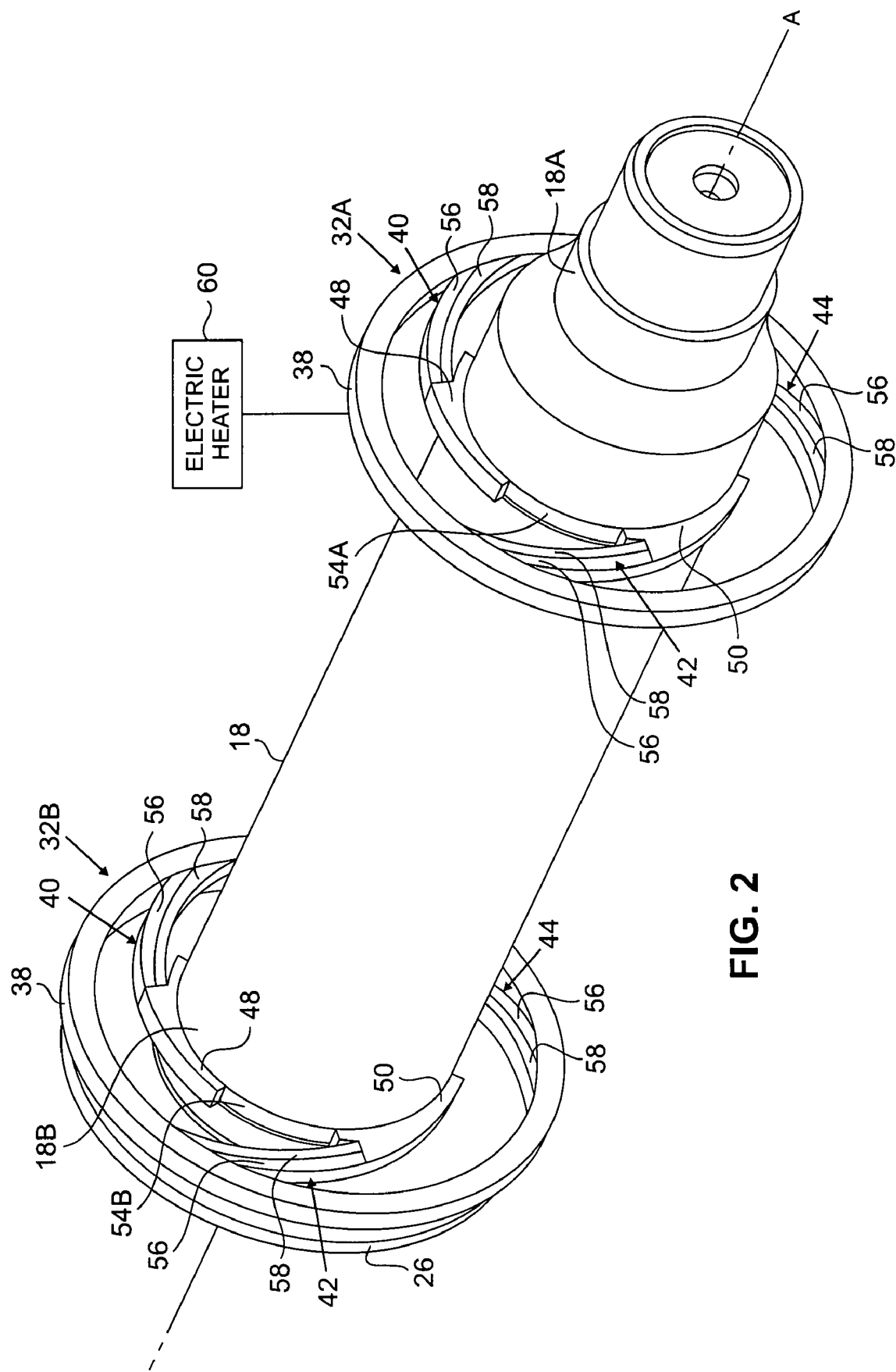
FIG. 2 is a perspective view of the restraint system and turboalternator shaft of FIG. 1, shown in isolation.

FIG. 2 is a perspective view of the restraint system 32 and the shaft 18, shown in isolation for clarity. As shown in FIG. 2, the shaft 18 defines a first end 18A and an opposite second end 18B, and further defines an axis of rotation A. The first restraint assembly 32A is positioned relative to the first end 18A of the shaft 18, and the second restraint assembly 32B is positioned relative to the second end 18B of the shaft 18. The first and second restraint assemblies 32A and 32B are substantially identical in the illustrated embodiment, although the assemblies 32A and 32B could differ in alternative embodiments.

Each of the restraint assemblies 32A and 32B includes a ring 38 that is positioned about the shaft 18 (i.e., to encircle the shaft 18) and secured to the housing 34 (shown in FIG. 1), three extensions 40, 42 and 44 that extend radially inwardly from the ring 38 toward the shaft 18, and pads 48, 50 and 52 (pads 52 are not visible in FIG. 2) that are supported by the extensions 40, 42 and 44, respectively. The extensions 42, 44 and 46 are substantially equally spaced from each other and each curve toward the shaft 18 in a spiral-type configuration. The pads 48, 50 and 52 are fixed to the radially inner ends of the extensions 40, 42 and 44, respectively, and have curved faces configured to form contact surfaces that can contact the shaft 18. As shown in FIG. 2, the restraint system 32 is engaged such that the pads 48, 50 and 52 are in contact with the shaft 18. Optional circumferential grooves 54A and 54B are formed along an outer surface of the shaft 18 relative to each restraint assembly 32A and 32B, and the pads 48, 50 and 52 extend at least partially into the grooves 54A and 54B when engaged.

The extensions 40, 42 and 44 are bimetallic structures that each comprise two layers 56 and 58 that are bonded or otherwise secured together. The radially outer layer 56 comprises a first material, and the radially inner layer 58 comprises a second material. The second material has a greater coefficient of thermal expansion than the first material, such that changes in ambient temperature cause the extensions 40, 42 and 44 to change shape to move the pads 48, 50 and 52 relative to the shaft 18. The first and second materials of the extensions 40, 42 and 44 can be bonded together using direct metal deposition, fiction welding, or other suitable techniques. The restraint system 32 is configured such that increases in temperature cause the pads 48, 50 and 52 to move away from the shaft 18, while decreases in temperature cause the pads 48, 50 and 52 to move toward the shaft 18. Any materials having differing coefficients of thermal expansion can be used the first and second materials, for example, aluminum and steel. The particular materials used can be selected as a function of the particular thermal operating conditions for a particular application. It should be noted that the rotor 18 typically comprises a material with a low coefficient of thermal expansion, such as a nickel-based superalloy like Inconel®, and therefore is assumed to experience no change in size due as a result of temperature changes. The ring 38 can be made of a material having a coefficient of thermal expansion that is similar or identical to that of a material of the housing 34.

When installed in the turboalternator 10, the restraint system 32 is configured so that the pads 48, 50 and 52 contact the shaft 18 and restrain the shaft 18 when ambient temperatures in the turboalternator 10 are relatively low. Engagement of the pads 48, 50 and 52 in the optional grooves 54A and 54B provides some restraint in the axial direction, in addition to restraint provided in generally radial directions. As used herein, the term "restraining" means to limit displacement of the shaft 18 relative to the axis of rotation A. A first thermal condition is defined at relatively low temperature conditions when the turboalternator 10 is in a non-operational state and the restraint system 32 is engaged, such as during a launch phase of a flight cycle, and relates to a range of temperatures that are below an operating temperature of the turboalternator 10. The particular operating temperature of the turboalternator 10 can vary for different applications.

When the turboalternator 10 reaches an operational temperature, the restraint system 32 is configured so that the pads 48, 50 and 52 move away from the shaft 18. A second thermal condition is defined at relatively high temperature conditions when the turboalternator 10 is in an operational state and the restraint system 32 disengages, such as during an orbital phase of a flight cycle, and relates to a range of temperatures that are at least as high as a minimum operating temperature of the turboalternator 10. In the second thermal condition, the radial distance between the pads 48, 50 and 52 increases relative to the axis of rotation A of the shaft 18 such that a gap is formed between the pads 48, 50 and 52 and the outer surface of the shaft 18. The gap can vary as desired for particular applications and is typically determined as a function of the configuration of the foil bearings 30A and 30B, however a gap of about 0.0254 mm (0.001 inch) or more will generally be sufficient. In the second thermal condition, the shaft 18 is essentially unrestrained by the restraint system 32. However, where the gap between the pads 48, 50 and 52 and the shaft 18 is small, the pads 48, 50 and 52 can permit shaft rotation while acting as "bumpers" to limit incidental displacement of the shaft 18 relative to the axis of rotation A and help maintain proper alignment of the shaft 18. In that situation, the contact surfaces of the pads 48, 50 and 52 can optionally be coated with a suitable dry film lubricant in order to reduce friction if and when the shaft 18 contacts the pads 48, 50 and 52 momentarily.

The temperature of the restraint system 32 is affected by ambient environmental temperatures as well as thermal energy from the external source that powers the turboalternator 10 during operation. More particularly, a coolant medium (e.g., lithium) will generally be warmed to the point of liquification before the turboalternator 10 is activated. As the coolant medium is heated and circulated, for instance, when passed through heat exchangers (not shown), thermal energy will radiate and conduct through the turboalternator 10 and to the restraint system 32. Generally, a thermal conduction path within the turboalternator is formed through the housing 34 and then to the rings 38 and extensions 40, 42 and 44.

An optional heater can be connected to any of the restraint assemblies 32A and 32B in order to directly provide thermal energy to the restraint system 32. An electric heater 60 connected to the ring 38 of the restraint assembly 32A is shown schematically in FIG. 2. The heater 60 can be used to help disengage the restraint system 32 more quickly, or to make disengagement of the restraint system 32 independent from the conduction of thermal energy through the turboalternator 10 from an external source.

Figure 3:
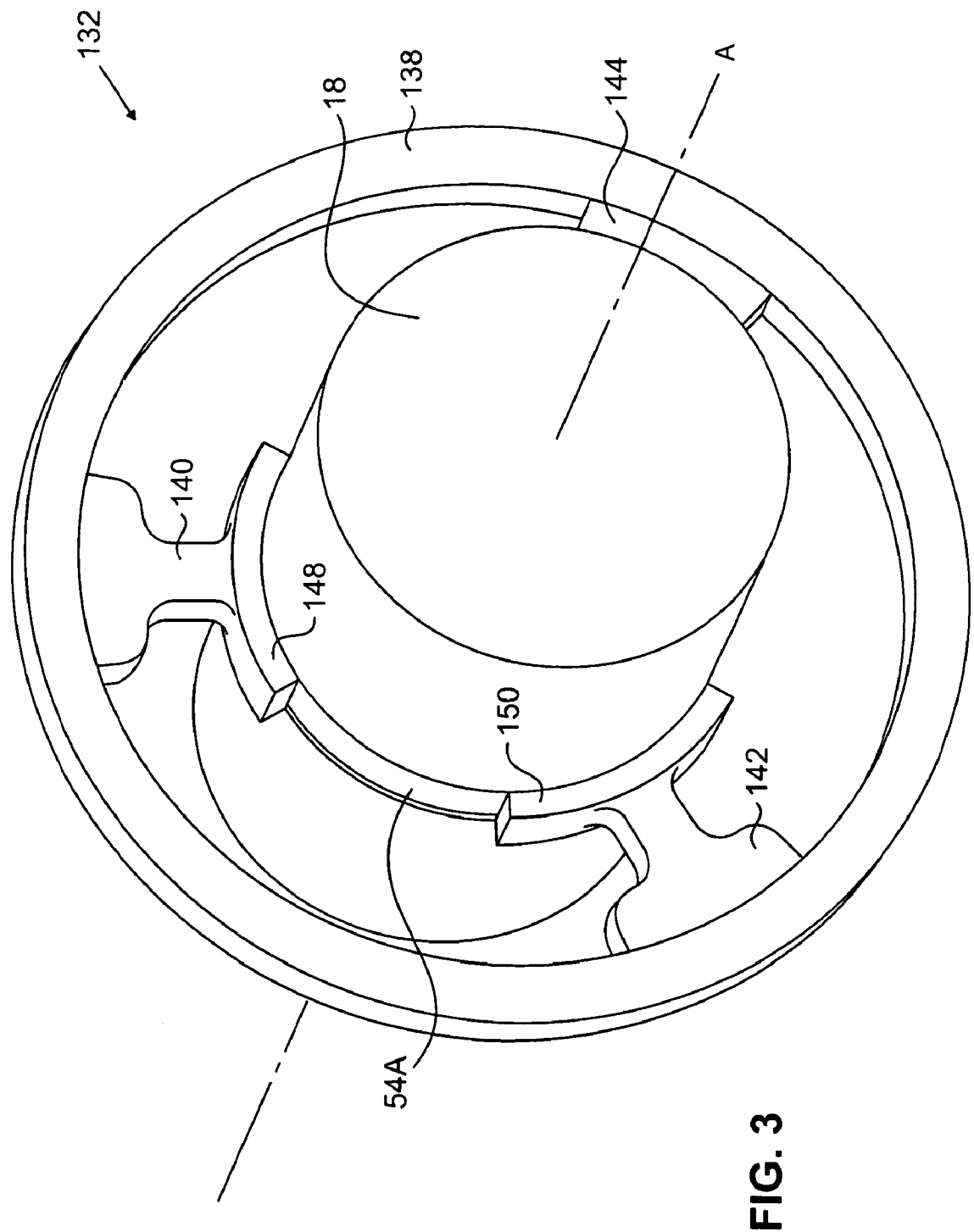
FIG. 3 is a perspective view of a portion of another embodiment of a restraint system according to the present invention.

It is contemplated that the restraint system of the present invention can have alternative embodiments. FIG. 3 is a perspective view of a portion of another embodiment of a restraint system 132 engaged to a portion of a shaft 18, shown in isolation. The restraint system 132 includes a restraint ring 138, three struts 140, 142 and 144, and pads 148, 150 and 152 (pad 152 is not visible in FIG. 3). The ring 138 is positioned about the first end 18A of the shaft 18. The struts 140, 142, 144 extend radially inward from the ring 138, and the pads 148, 150 and 152 are supported by the struts 140, 142, 144, respectively. The ring 138 comprises a first material, and the struts 140, 142, 144 comprise a second material. The first material is selected to have a relatively high coefficient of thermal expansion, while the second material is selected to have a relatively low coefficient of thermal expansion.

In general, the operation of the restraint system 132 is similar to the restraint system 32 described above in that during a first thermal condition the restraint system 132 is engaged to the shaft 18 and at a higher temperature second thermal condition the restraint system 132 disengages. However, unlike the restraint system 32, the restraint system 132 operates due to the increase in a radial dimension of the ring 138 as the temperature of the restraint system 132 increases. The struts 140, 142, 144 undergo little or no change in size as temperature of the system 132 increases, but instead the struts 140, 142, 144 move the pads 148, 150 and 152 relative to the surface of the shaft 18 and the axis of rotation A as the radial dimension of the ring 138 changes.

The housing 34 to which the ring 138 is secured can be made of a material with a coefficient of thermal expansion that is similar or identical to the ring 138, in order to accommodate the changes in radial dimension of the ring 138 while still maintaining secure mechanical support.

Figure 4:
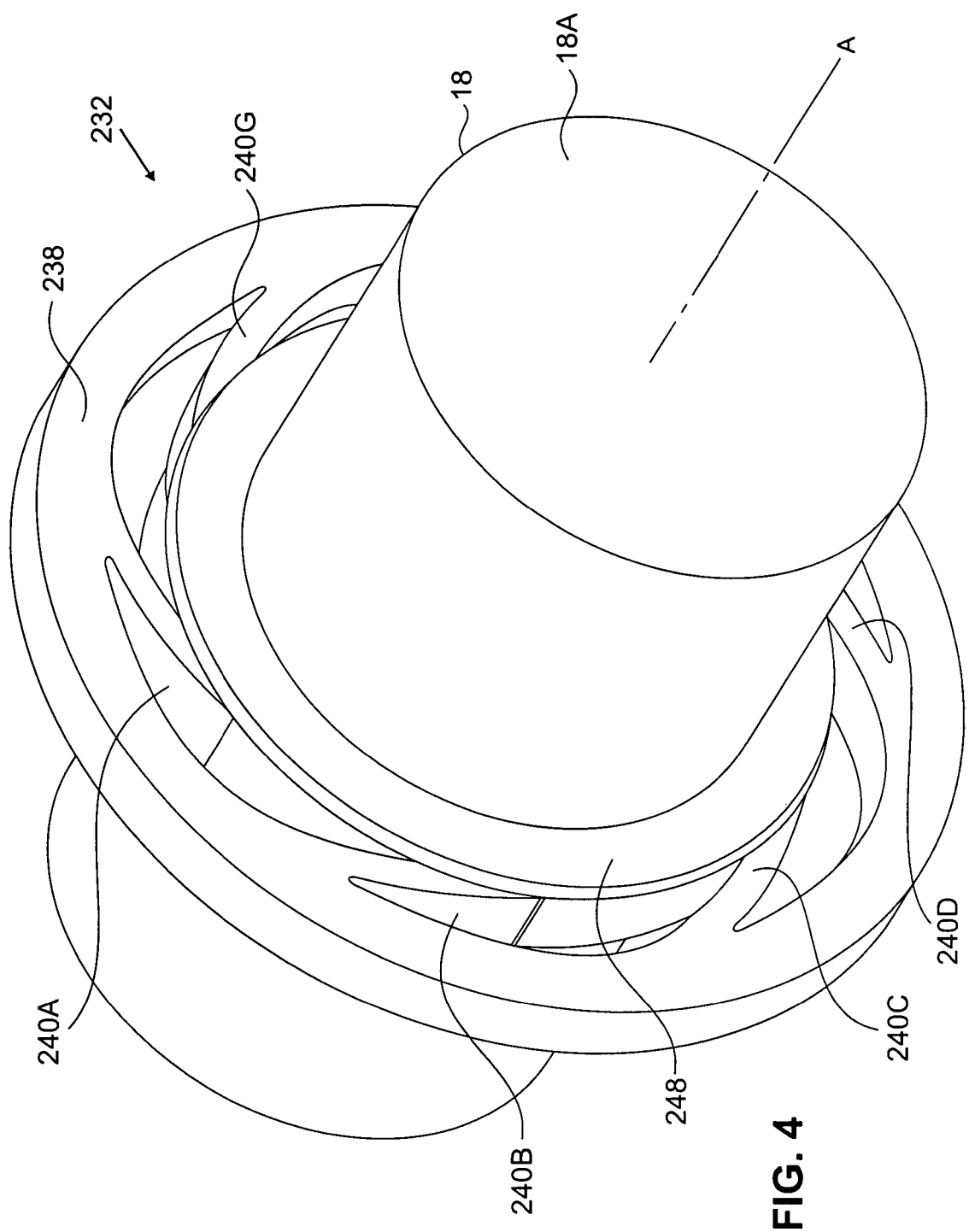
FIG. 4 is a perspective view of a portion of another embodiment of a restraint system according to the present invention.

FIG. 4 is a perspective view of a portion of another embodiment of a restraint system 232 engaged to a portion of a shaft 18, shown in isolation. FIG. 5 is a cross-sectional perspective view of the restraint system 232. The restraint system 232 includes an outer ring 238, seven springs 240A-240G (springs 240E and 240F are not visible in FIG. 4), and an inner ring 248. The outer ring 238 is positioned to about the first ends 18A of the shaft 18, and is spaced from the outer surface of the shaft 18. The springs 240A-240G extend radially inward from the outer ring 238 in a substantially equally circumferentially spaced spiral-type configuration, and each of the springs 240A-240G acts as a leaf spring. The inner ring 248 is positioned adjacent to the outer surface of the shaft 18 and acts like a circular pad for restraining the shaft 18 like the pads described above. A circumferential groove 270 is formed on a radially outer face of the inner ring 248 between a pair of axially spaced ramp structures 272A and 272B. The springs 240A-240G are engaged in the groove 270, which secures the inner ring 248 relative to the out ring 238. The ramp structures 272A and 272B have a slope that facilitates assembly, by allowing the inner ring 248 to be slid into engagement inside the springs 240A-240G.

The inner ring 248 comprises a first material having a relatively high coefficient of thermal expansion, and the outer ring 238 comprises a second material that can have a lower coefficient of thermal expansion. The springs 240A-240G can be formed unitarily with the outer ring 238 and of the same material (i.e., the second material).

In general, the operation of the restraint system 232 is similar to the restraint systems 32 and 132 described above in that during a first thermal condition the restraint system 232 is engaged to the shaft 18 and at a higher temperature second thermal condition the restraint system 232 disengages. However, unlike the restraint systems 32 and 132, the restraint system 232 operates due to the increase in a radial dimension of the inner ring 270 as the temperature of the restraint system 232 increases. As the temperature of the restraint system 232 increases, the inner ring 270 increases in a radial dimension as the first material expands. In the second thermal condition, a gap is formed between the inner diameter of the inner ring 270 and the outer surface of the shaft 18. Spring force of the springs 240A-240G helps keep the inner ring 270 centered about the axis of rotation A of the shaft 18.

Although the present invention has been described with reference to preferred embodiments, workers skilled in the art will recognize that changes can be made in form and detail without departing from the spirit and scope of the invention. For instance, the particular configuration of the restraint system according to the present invention can vary as desired for particular applications. Furthermore, the restraint system of the present invention can be utilized with nearly any type of rotatable component. Moreover, optional features described above, such as circumferential grooves in the shaft, dry film lubricants, and heaters, can be utilized with any embodiment of the present invention.

What is claimed is:

1. A turboalternator system comprising:
 a turboalternator having a rotatable member operatively engaged to a bearing set, the rotatable member defining a first end, a second end and an axis of rotation;
 a radial support element;
 a contact structure engaged with the radial support element, wherein the turboalternator system is configured to be thermally adjustable such that in a first thermal condition the contact structure is at a first radial position with respect to the axis of rotation and contacts the rotatable member to provide support, and wherein the turboalternator system is further configured such that in a second thermal condition the contact structure is at a second radial position with respect to the axis of rotation that is spaced further from the axis of rotation than the first radial position; and
 a groove formed in the rotatable member, wherein in the first thermal condition the contact structure extends into the groove to restrict axial movement of the rotatable member.

2. The system of claim 1 and further comprising:
 a housing, wherein the bearing set supports the rotatable member relative to the housing during operation of the turboalternator.

3. The system of claim 1, wherein the radial support element includes a first restraint ring comprising a first material and positioned about the rotatable member, and a strut comprising a second material that extends between the first restraint ring and the contact structure.

4. The system of claim 1, wherein the radial support element is located at or near the first end of the rotatable member.

5. The system of claim 1, wherein the contact structure comprises a ring having a groove formed in an outer diameter surface, and wherein the radial support element engages the groove in the contact structure.

6. The system of claim 1, wherein the first thermal condition comprises a temperature range that is below a minimum operating temperature of the turboalternator.

7. The system of claim 1 and further comprising:
 a dry film lubricant disposed on a surface of the contact structure that contacts the rotatable member in the first thermal condition.

8. The system of claim 1, wherein the bearing set comprises a foil bearing.

9. The system of claim 1 and further comprising:
 a heating element for actively supplying thermal energy to the radial support element.

10. A thermally adjustable restraint system for a rotatable member supported on a housing by a bearing set comprising:
 a first restraint ring positionable around the rotatable member at or near a first end, the first restraint ring having a plurality of thermally motive elements extending therefrom, each thermally motive element being engaged to a pad structure, wherein the plurality of thermally motive elements extending from the first restraint ring are each configured such that in a first thermal condition the pad structure contacts the rotatable member to provide support, and wherein each of the thermally motive elements extending from the first restraint ring is further configured such that in a second thermal condition the pad structure is generally spaced from the rotatable member;
 a second restraint ring positionable around the rotatable member at or near a second end, the second restraint ring having a plurality of thermally motive elements extending therefrom, each thermally motive element being engages to a pad structure, wherein the plurality of thermally motive elements extending from the second restraint ring are each configured such that in the first thermal condition the pad structure contacts the rotatable member to provide support, and wherein each of the thermally motive elements extending from the second restraint ring is further configured such that in the second thermal condition the pad structure is generally spaced from the rotatable member; and a groove formed in the rotatable member, wherein in the first thermal condition the pads of the thermally motive elements of the first restraint ring extend into the groove to restrict axial movement of the rotatable member.

11. The system of claim 10, wherein the first thermal condition is lower in temperature than the second thermal condition.

12. The system of claim 10, wherein the rotatable member comprises a shaft of a turboalternator, and wherein the first thermal condition comprises a temperature range that is below a minimum operating temperature of the turboalternator.

13. The system of claim 10 and further comprising:
a dry film lubricant disposed on a surface of each pad structure that contacts the rotatable member in the first thermal condition.

14. The system of claim 10, wherein the bearing set comprises a foil bearing.

15. The system of claim 10 and further comprising:
a heating element for actively supplying thermal energy to at least one of the thermally motive elements.

16. A selectively adjustable restraint system for a turboalternator having a rotatable member that defines a first end, a second end and an axis of rotation, and a foil bearing configured to support the rotatable member during operation, the system comprising:

a first bimetallic support structure positioned around the rotatable member at or near the first end, the first bimetallic support structure having a first ring portion and a first pad portion supported by the first ring portion and configured such that in a first thermal condition the first pad portion contacts the rotatable member to provide support at or near the first end of the rotatable structure, and in a second thermal condition the first pad portion is generally spaced from the axis of rotation at a greater radial distance than in the first thermal condition; and a second bimetallic support structure positioned around the rotatable member at or near the second end, the second bimetallic support structure having a second ring portion and a second pad portion configured such that in the first thermal condition the second pad structure contacts the rotatable member to provide support at or near the second end of the rotatable structure, and in a second thermal condition the second pad portion is generally spaced from the axis of rotation at a greater radial distance than in the first thermal condition;

a groove formed in the rotatable member, wherein in the first thermal condition the first pad portion of the first bimetallic structure extends into the groove to restrict axial movement of the rotatable member, wherein the second thermal condition is greater in temperature than the first thermal condition.

17. The system of claim 16, wherein the first thermal condition comprises a temperature range that is below a minimum operating temperature of the turboalternator.

18. The system of claim 16 and further comprising:
a dry film lubricant disposed on surfaces of the first and second pad portions that contact the rotatable member in the first thermal condition.

19. The system of claim 16 and further comprising:
a heating element for actively supplying thermal energy to at least one of the bimetallic support structures.

20. The system of claim 16, wherein the first pad portion comprises a ring having a groove formed in an outer diameter surface, and wherein a protrusion extending from the first ring portion engages the groove in the pad structure.

21. The system of claim 16, wherein the first bimetallic structure further comprises a strut comprising a first material that extends between the first ring portion and the first pad portion, wherein the first ring portion comprises a second material.

* * * * *